United States Patent
Burton (10) Patent No.: US 6,773,153 B2
(45) Date of Patent: Aug. 10, 2004

(54) ADJUSTER FOR HEADLAMP ASSEMBLY

(75) Inventor: John E. Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 171 days.

(21) Appl. No.: 09/941,235

(22) Filed: Aug. 28, 2001

(65) Prior Publication Data

US 2003/0043591 A1 Mar. 6, 2003

(51) Int. Cl.$^7$ ............................................. F21V 21/14
(52) U.S. Cl. ...................... 362/528; 362/529; 362/531; 362/532
(58) Field of Search .................... 362/524, 512, 362/514, 515, 528, 529, 531, 532, 421

(56) References Cited

U.S. PATENT DOCUMENTS

| | | |
|---|---|---|
| 4,674,018 A | 6/1987 | Ryder et al. |
| 4,703,399 A | 10/1987 | Van Duyne et al. |
| 4,737,891 A | 4/1988 | Burton |
| 4,796,494 A | 1/1989 | Eckenrode et al. |
| 4,930,367 A | 6/1990 | Nagasawa |
| 4,939,945 A | 7/1990 | Ryder et al. |
| 5,079,676 A | 1/1992 | Lisak |
| 5,163,746 A | 11/1992 | Lisak |
| 5,214,971 A | 6/1993 | Burton et al. |
| 5,285,360 A | 2/1994 | Kanner |
| 5,309,780 A | 5/1994 | Schmitt |
| 5,355,287 A * | 10/1994 | Denley ...................... 362/421 |
| 5,483,426 A | 1/1996 | Lewis et al. |
| 5,707,133 A | 1/1998 | Burton |
| 5,775,795 A | 7/1998 | Christian et al. |
| 5,779,343 A * | 7/1998 | Denley ...................... 362/289 |
| 5,897,202 A | 4/1999 | Denley |
| 6,017,136 A | 1/2000 | Burton |
| 6,042,254 A | 3/2000 | Burton |
| 6,050,712 A | 4/2000 | Burton |
| 6,231,222 B1 | 5/2001 | Daumueller et al. |
| 6,257,747 B1 | 7/2001 | Burton |
| 6,447,154 B1 | 9/2002 | Denley |
| 6,450,674 B2 | 9/2002 | Denley |
| 2001/0030875 A1 | 10/2001 | Denley |

* cited by examiner

Primary Examiner—Thomas M. Sember
(74) Attorney, Agent, or Firm—Brian G. Gilpin; Godfrey & Kahn, S.C.

(57) ABSTRACT

A lightweight and compact headlamp adjuster is constructed primarily from plastic materials. The adjuster may include a VHAD that is non-recalibratable after the headlamp aim is factory set. The adjuster includes an input shaft that engages a gear located within a housing. When the input shaft is rotated, a ball stud moves linearly to adjust the headlamp to which it is connected. The adjuster is not subject to over-adjustment when it includes a clutching mechanism provided by the interaction of the ball stud with the gear.

22 Claims, 10 Drawing Sheets

ADJUSTER FOR HEADLAMP ASSEMBLY

FIELD OF THE INVENTION

This invention relates generally to headlamp adjusters, and more particularly to a compact headlamp adjuster that can incorporate a clutching feature to prevent over-extension or over-retraction of the ball stud.

BACKGROUND OF THE INVENTION

There is a trend in the automobile industry to use internally adjustable reflector headlamps. Internally adjustable reflector headlamps include a reflector and bulb socket assembly enclosed within a sealed headlamp housing and lens. The orientation of the reflector within the housing is adjustable to control the direction of the light beam cast by the headlamp. Typically, the adjustable reflector is supported by three ball studs that extend from the rear of the headlamp housing and fit within sockets located on the back of the reflector. A middle ball stud is secured directly to the headlamp housing to provide a fixed pivot point for the reflector. The other two ball studs are connected to adjuster mechanisms secured to the rear of the headlamp housing. By operating the adjuster mechanisms, the ball studs can be extended and retracted to control the horizontal and vertical orientation of the reflector. Examples of such adjusters include those disclosed in U.S. Pat. Nos. 5,707,133 and 5,214,971 to Burton et al., U.S. Pat. No. 5,483,426 to Lewis et al., U.S. Pat. No. 4,796,494 to Eckenrode et al., and U.S. Pat. No. 4,703,399 to Van Duyn et al.

United States National Highway Traffic Safety Administration ("NHTSA") standards require that horizontal adjuster mechanisms used in connection with internally adjustable reflector headlamps must be either non-readjustable after the proper aim has been achieved or be equipped with a non-recalibratable vehicle headlamp aiming device ("VHAD") which is zeroed after the proper aim has been achieved. As such, vehicle manufacturers must either aim the lamps and provide a mechanism to prevent future readjustment, or aim the lamps and provide a non-recalibratable VHAD which is properly zeroed. One method of providing a non-recalibratable VHAD is disclosed in U.S. Pat. No. 6,042,254 to Burton (the inventor of the present invention), the disclosure of which is incorporated herein by reference. Several methods of providing a non-readjustable headlamp adjuster are disclosed in U.S. Pat. No. 6,050,712 to Burton, the disclosure of which is incorporated herein by reference.

One problem experienced when using existing adjuster devices, regardless of whether they are in compliance with NHTSA standards, is that they suffer one or a combination of the followings draw backs: excess cost; failure due to a lack of strength; failure due to corrosion; an unreliable air tight seal between the ball stud and adjuster housing allowing the entrance of contaminants into the headlamp; and size not being compact enough for some of the new aerodynamic vehicle designs in which space in the front of the vehicle is at a premium. When all or most of the adjuster parts are manufactured from metal, strength is more easily achieved but failure due to corrosion can frequently result and plating must be used in an effort to resist corrosion. Substantial corrosion in the threaded region is most detrimental because it can cause the threads to jam and become inoperative. Plating, while somewhat helpful, provides only limited resistance to corrosion and adds a significant cost. When all or most of the adjuster parts are manufactured from plastic, inadequate strength or stiffness can be an issue when trying to provide a design with a compact size. For instance, plastic gears using conventional gear tooth designs can easily strip, especially if the gears are inadequately supported within the adjuster housing. This stripping most easily occurs when the device is "over adjusted" beyond the designed travel capabilities of the adjuster mechanism. Conventional gear tooth designs use equal tooth thickness on both gears which does not maximize stripping resistance if the material strength of one gear is greater than the other. Further, many existing adjuster housing designs lack adequate gear support to prevent the gears from partially or fully separating under high torque conditions. When the gears separate under torque the gear teeth are not fully engaged and stripping resistance is reduced. Accordingly, a need exists for an adjuster that is in accordance with NHTSA standards and is low cost, compact in design, prevents failure due to corrosion, has a reliable air-tight seal to the headlamp, and resists stripping and failure of internal components.

SUMMARY OF THE INVENTION

The present invention relates to a low cost and compact adjuster that is primarily constructed from plastics, non-metal materials, or composites such as glass-filled nylon, and can be used in connection with a non-recalibratable VHAD or can be adapted to be non-readjustable after factory adjustment. As described in more detail in the detailed description below, and shown in the accompanying drawings, the adjuster components are constructed either entirely or from a high percentage of plastic or composite materials. The adjuster has several primary components, namely an input shaft, a non-recalibratable VHAD (if desired), a housing, a gear, and a ball stud. The housing journals the gear which in turn engages a bevel gear on the end of the input shaft. The ball stud has a toothed portion on one end that engages an internal ribbed surface of the gear. When the input shaft is rotated, the gear turns causing the ball stud to rotate and move axially.

The adjuster is not subject to stripping or over-adjustment when it includes a clutching mechanism. When the ball stud reaches the end of the desired travel path, the toothed portion no longer engages the ribbed surface of the gear. At this point, the gear continues to rotate but slips in relation to the ball stud. The ball stud can be made to move in an opposite linear direction by reversing the rotation direction of the input shaft. When this is done, tangs inside the gear catch and engage the toothed portion causing it to move in the reverse direction. The adjuster housing and ball stud arrangement act to rigidly support the bevel gears in relation to each other to maintain full tooth engagement even under high torque conditions.

The adjuster is sealed to prevent moisture from entering into the headlamp assembly. The seal can be obtained with a gasket and O-ring that connect to the housing, or with a molded member that is injection molded directly onto the housing.

In sum, the present invention represents a significant improvement over the prior art in many ways. The adjuster of the present invention is compact and lightweight, is efficiently and economically handled in the headlamp or vehicle assembly process, is in conformance with NHTSA standards, and overcomes the disadvantages of the prior art. While the present invention is particularly useful in headlamp assemblies, other applications are possible and references to use with headlamp assemblies should not be deemed to limit the application of the present invention. In particular, the present invention may be advantageously adapted for use where similar performance capabilities and characteristics are desired. These and other objects and advantages of the present invention will become apparent from review of the detailed description, claims, and accompanying drawings.

DETAILED DESCRIPTION

Figure 1:
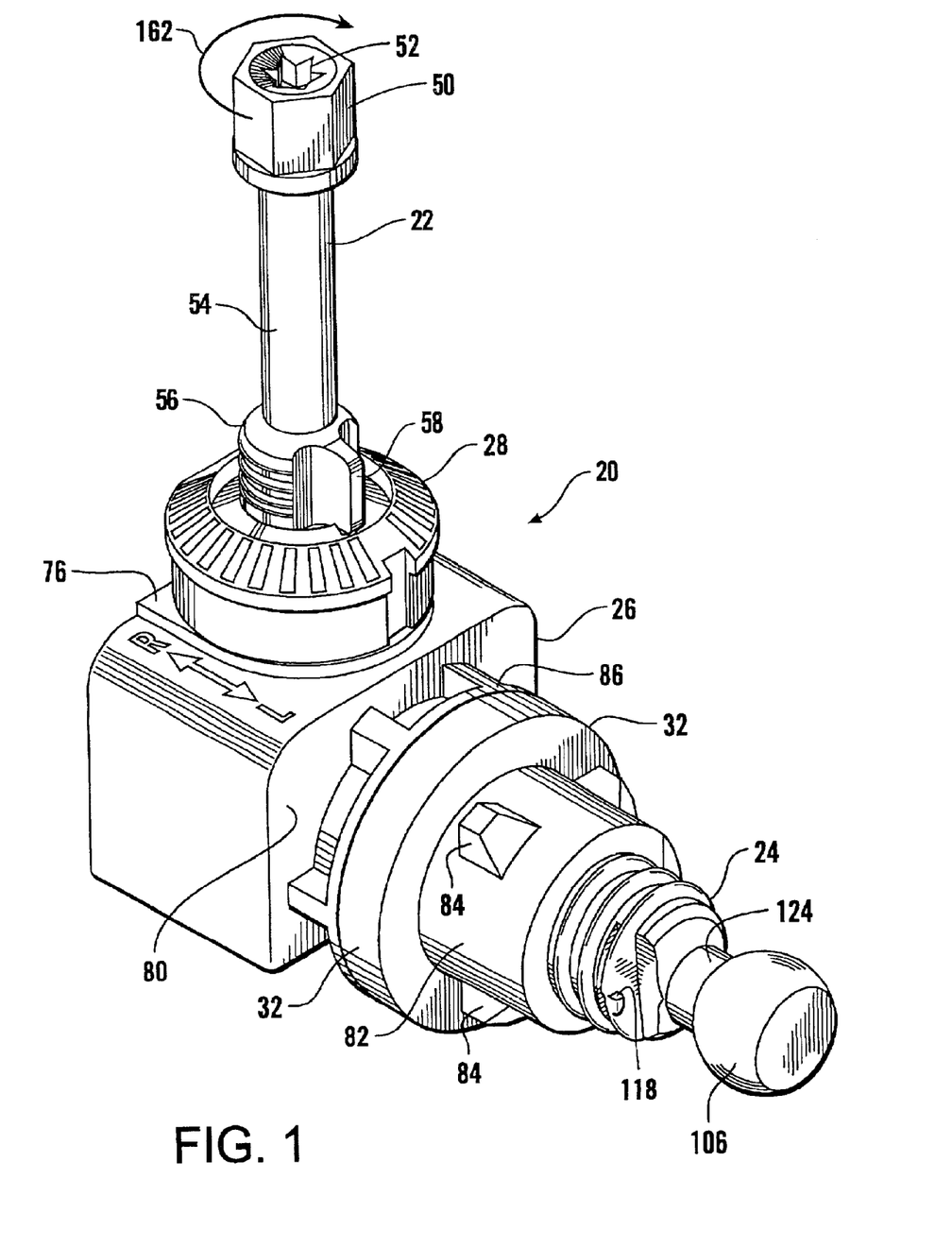
FIG. 1 is a front perspective view of one embodiment of the adjustment mechanism of the present invention.
Figure 2:
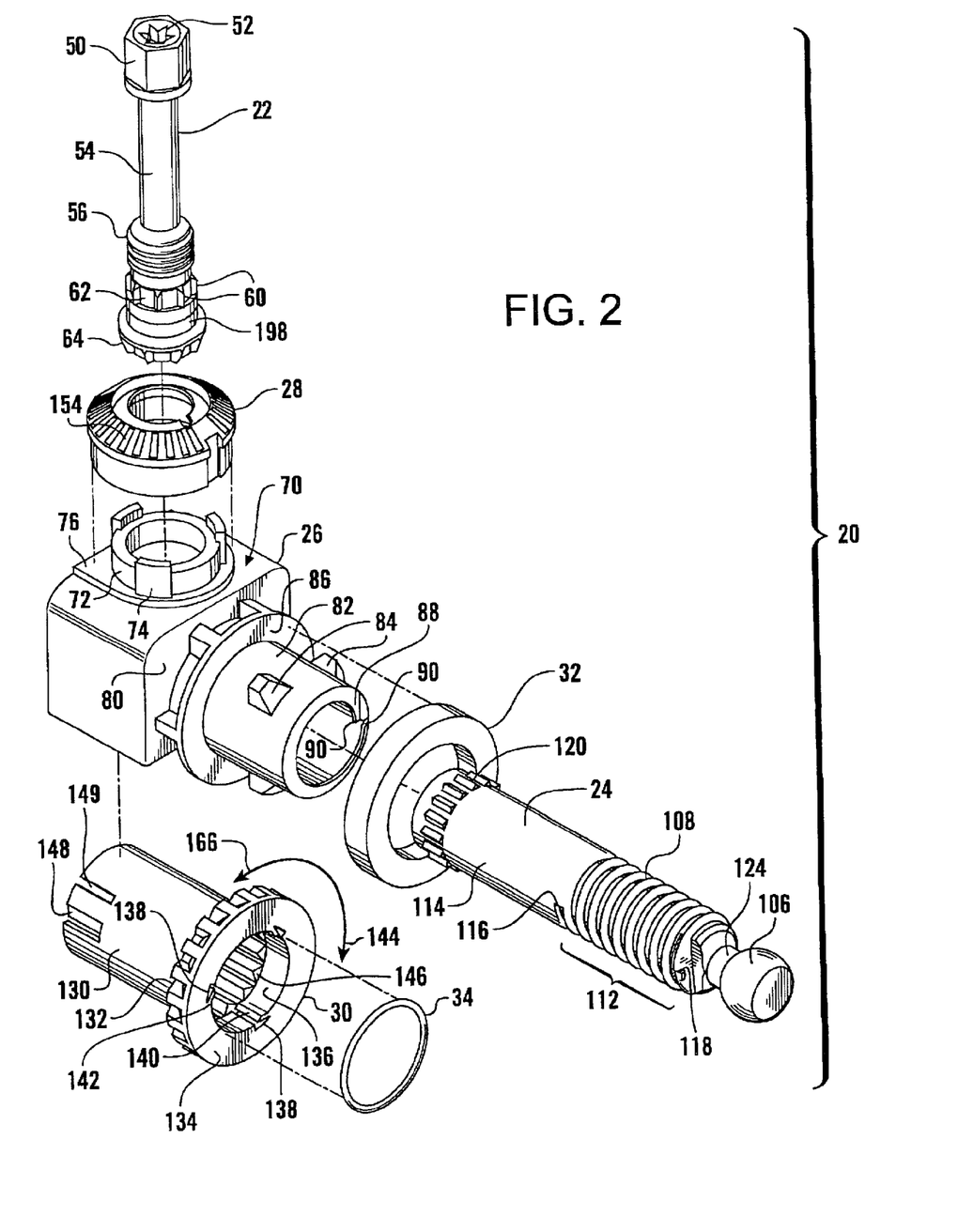
FIG. 2 is an exploded view of the adjustment mechanism shown in FIG. 1.
Figure 3:
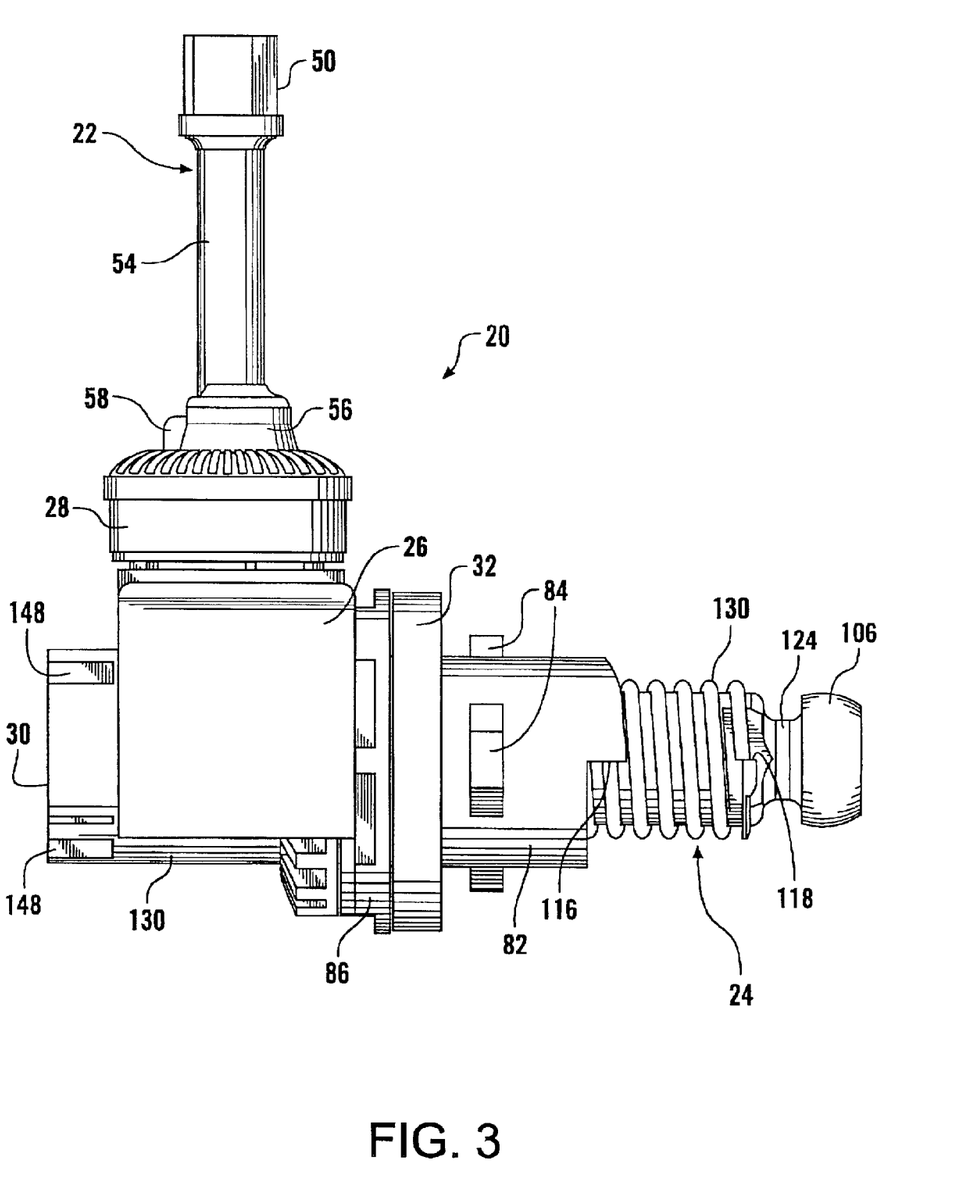
FIG. 3 is a side elevational view of the adjustment mechanism shown in FIG. 1.
Figure 4:
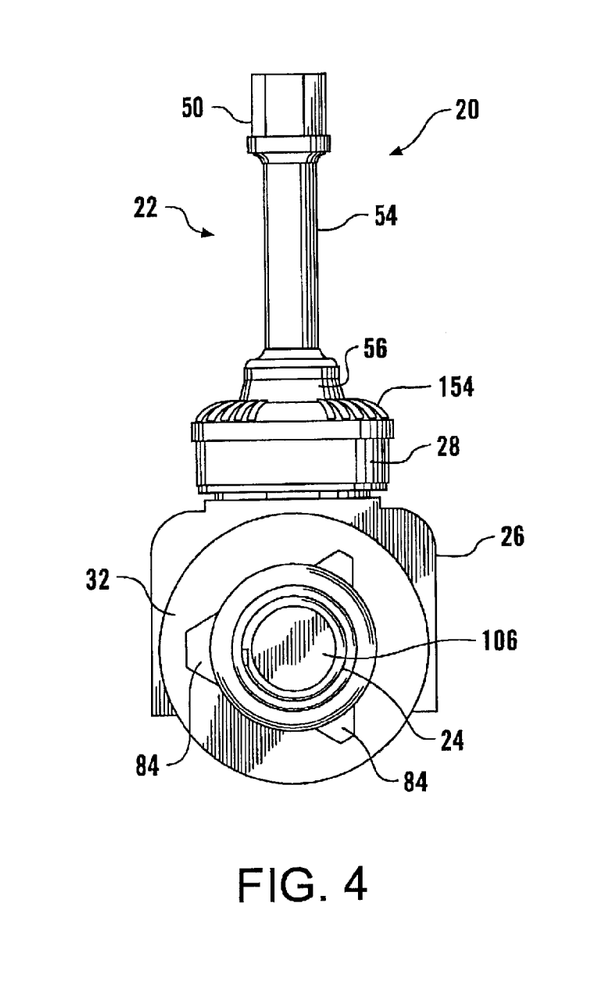
FIG. 4 a front elevational view of the adjustment mechanism shown in FIG. 1.

FIG. 1 is a perspective view of one embodiment of the adjuster 20 having an input shaft 22 operably connected to a ball stud 24, both of which are generally positioned by housing 26. The exploded view of FIG. 2 is a more detailed showing of the separate components of adjuster 20. The additional components shown in FIG. 2 include a non-recalibratable vehicle headlamp aiming device dial 28 (hereinafter "VHAD 28"), a gear 30, a gasket 32 and an O-ring 34.

Figure 13:
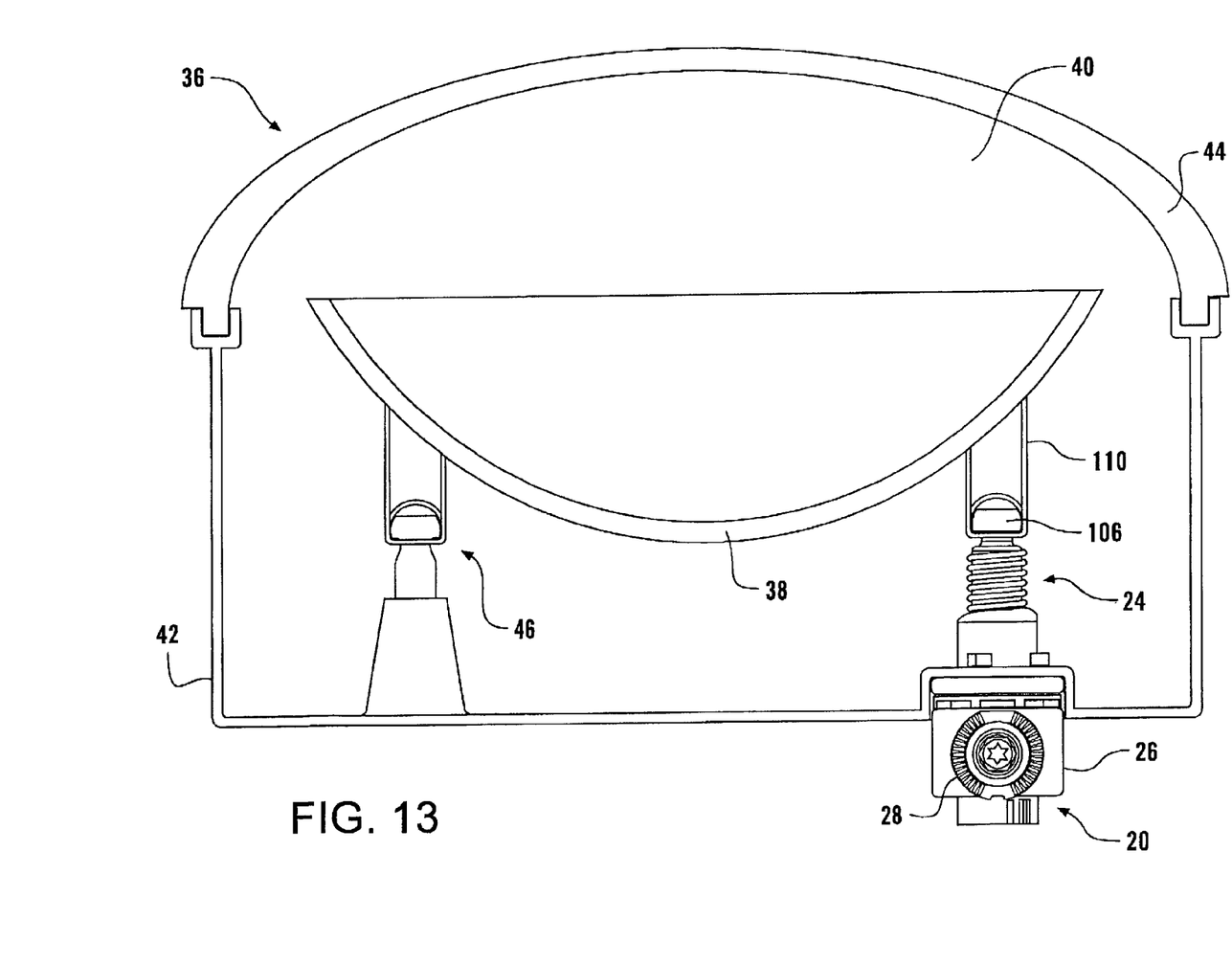
FIG. 13 is a top sectional view of the adjustment mechanism of FIG. 1 positioned within a headlamp assembly (shown generally, not in detail)

Input shaft 22 is the component that is used by the automobile technician or vehicle owner to aim a corresponding headlamp reflector 38, seen in FIG. 13. Input shaft may be constructed from die-cast zinc, other metal, from a hard plastic, or other material with similar properties. At the top of input shaft 22 is an engagement head 50, which may be hexagonal as shown or other shape, and may include some type of depression 52 to accommodate a tool for applying torque. Shown by way of example is a hexagonal held with a TORX® shaped depression. A collar 56 is separated from head 50 by a shaft body 54. Collar 56 has a radially extending pointer 58 extending therefrom for engagement with the VHAD 28. Next to collar 56 are several radially extending teeth 60 that serve as a planetary gear 62 within VHAD 28. At the distal end of the shaft body 54 from head 50 is a bevel gear 64 that engages gear 30.

Housing 26 serves to support input shaft 22 so that it properly engages gear 30. Housing 26 may be manufactured from injection molded plastic although other manufacturing techniques and/or materials could be used. From the exterior of housing 26 several features can be seen. On the top surface 70 is an annular header 72 having a number of fingers spaced thereon to accommodate VHAD 28. Header 72 may be elevated from surface 70, or be a shoulder 76 as shown. From the front surface 80 projects a barrel 82. The barrel 82 has several lugs 84 or the like (i.e. screw mount, different type or number of lugs, etc.) projecting from its exterior surface. Lugs 84 are used to mount the adjuster in the back of the support frame using a quarter-turn method. While four lugs 84 are shown, other numbers could be used and other means utilized for mounting the adjuster. A flange 86 surrounds the outer circumference of structure 82 and serves as a seat for gasket 32. The gasket 32 seals the adjuster to the back of the support frame and the O-ring seals the internal part of adjuster. Thus, a vapor barrier is created to prevent moisture from condensing on the inside of the assembly. At the distal end of barrel 82 is a radial lip 88 that projects inwardly and is shaped to fit one revolution of the spiral threads 108 on ball stud 24. Lip 88 has an offset "break" therein so to form a stop 90, the function of which is described below.

Figure 7:
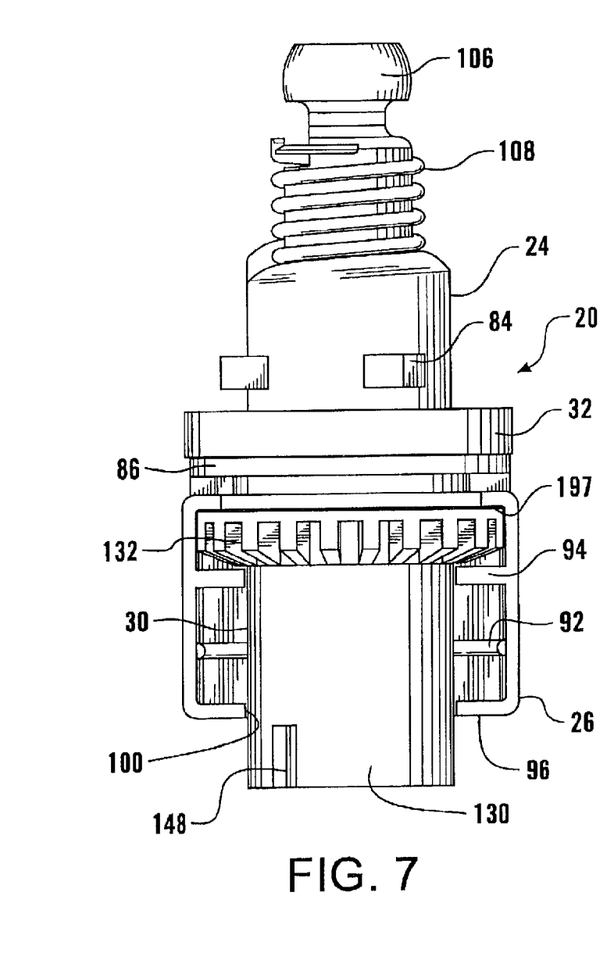
FIG. 7 a bottom view of the adjustment mechanism shown in FIG. 1.
Figure 11:
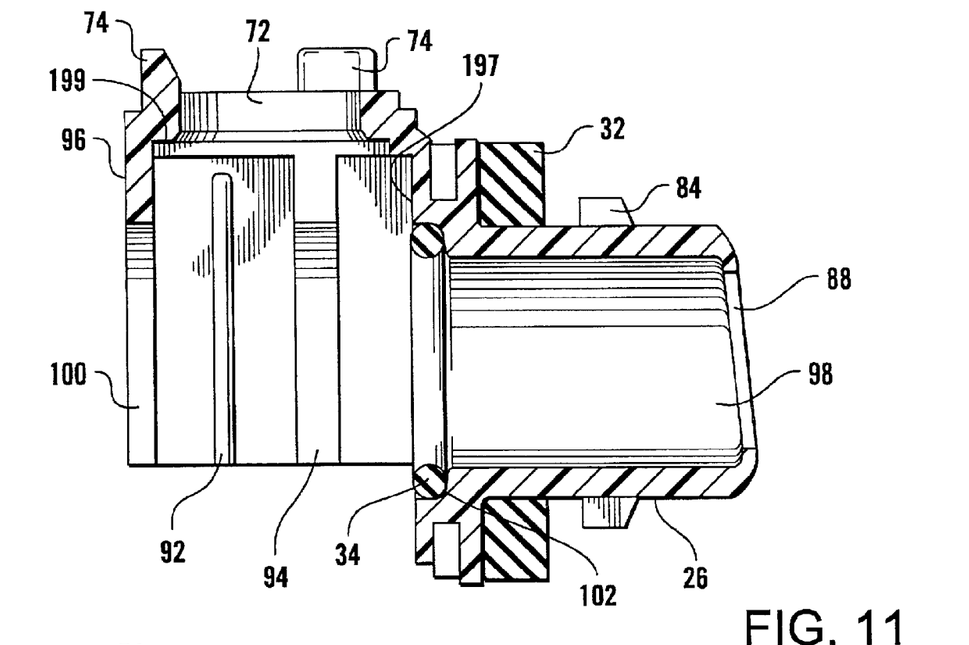
FIG. 11 is a side sectional view of the housing used in the adjustment mechanism of FIG. 1.

Referring to FIGS. 7 and 11, the inner surface of housing 26 has a pair of ribs 92, 94. Rib 92 is rather shallow, and may be included to provide structural support to housing 26. Rib 94 fits against the cylindrical body 130 and the teeth on of gear 30 to keep the gear from sliding in its axial direction. The rear surface 96 of housing 26 has a semicircular notch (defined by surface 100) cut therein that also fits against the cylindrical body 130. There is communication between the ribbed portion of housing 26 and cavity 98 to allow ball stud 26 to extend through housing 26 and gear 30. Additional ribs or other structure may be included to provide structural support for the housing 26 or to ensure proper journalling of the gears.

Figure 5:
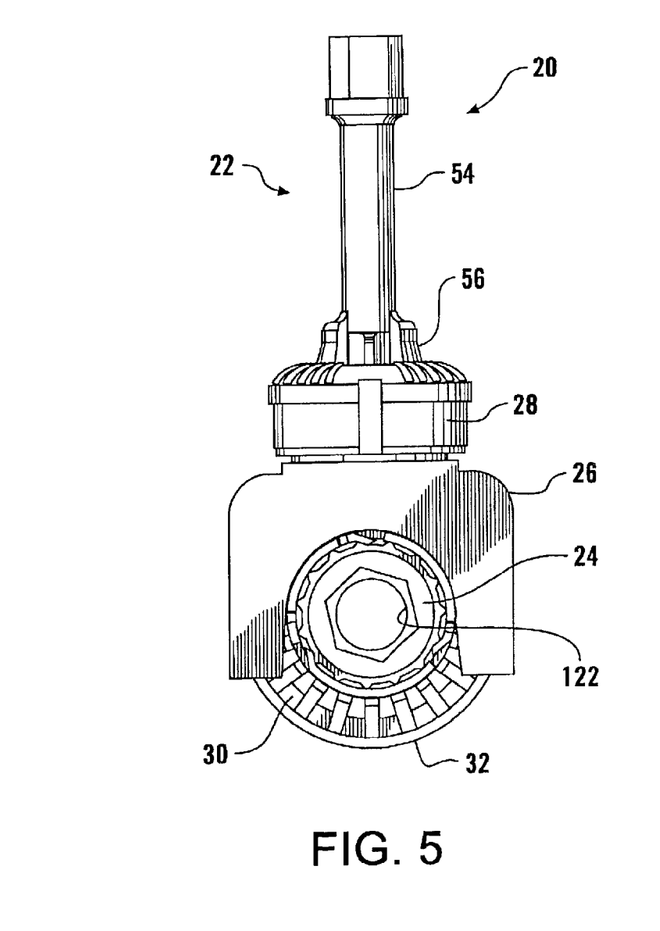
FIG. 5 a rear elevational view of the adjustment mechanism shown in FIG. 1.
Figure 6:
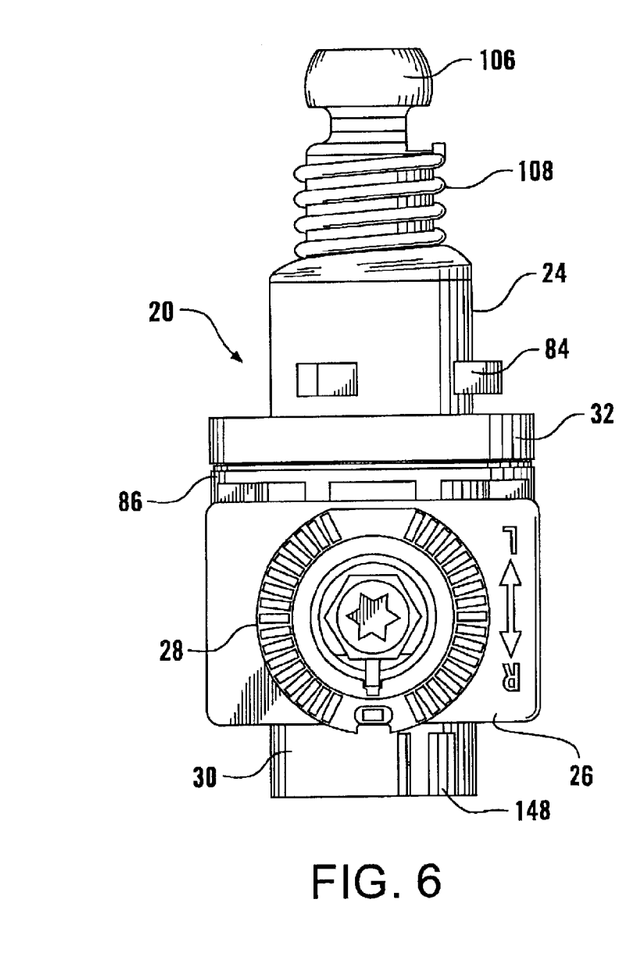
FIG. 6 is a plan view of the adjustment mechanism shown in FIG. 1.
Figure 10:
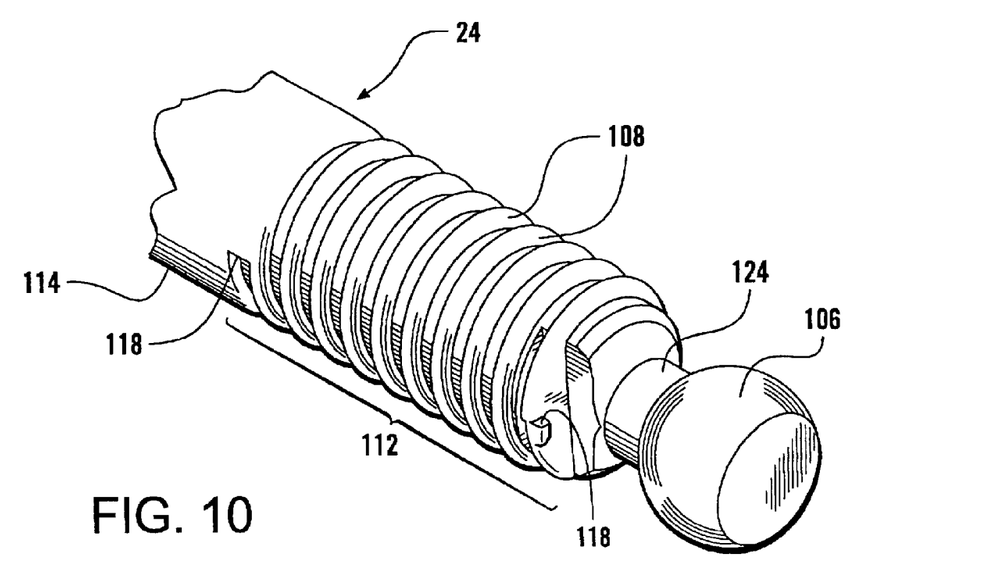
FIG. 10 is a partial front perspective view of the ball stud used in the adjustment mechanism of FIG. 1.

Referring to FIGS. 2 and 10, ball stud 24 is mostly hollow cylindrical member that is preferably constructed from a tough plastic composite such glass-filled nylon. Ball stud 24 could be made from other types of plastic, plastic composites or from metal and may be solid as well. At the front end of ball stud 24 is a ball 106 that could be of various shapes depending on the type of socket 110 into which it is placed to be secured to the reflector, see FIG. 13. A threaded portion 108 is located on the main body 114 adjacent to ball 106. As seen most clearly in FIG. 10, there is an abrupt stop 116 at the front end of the threaded portion 108, and abrupt stop 118 at the threaded portion rear end. The stops 116, 118 interact with the housing lip 88 to prevent to ball stud from being over adjusted in either direction. The length of the threaded portion 108 and location of the abrupt stops 116 and 118 are determined by the desired maximum and minimum extension of the ball stud 24. Near the rear section of ball stud 24 is a series of teeth 120 extending radially from the main body 114. The teeth 120 will engage an inner surface of the gear 30 as described herein. As mentioned, ball-stud 24 is preferably hollow, at least in a portion of the main body 114, and preferably up to the neck adjacent ball 106. This has the advantage of reducing cost and weight as compared to solid ball studs. The use of a relatively large diameter hollow body resists deflection better than other solid plastic ball studs of smaller dimension. At the rear portion of ball stud 24 nearest the end, the inner surface 122 may be hexagonal, TORX® or other shape to accommodate an assembly tool, see FIG. 5.

Figure 9:
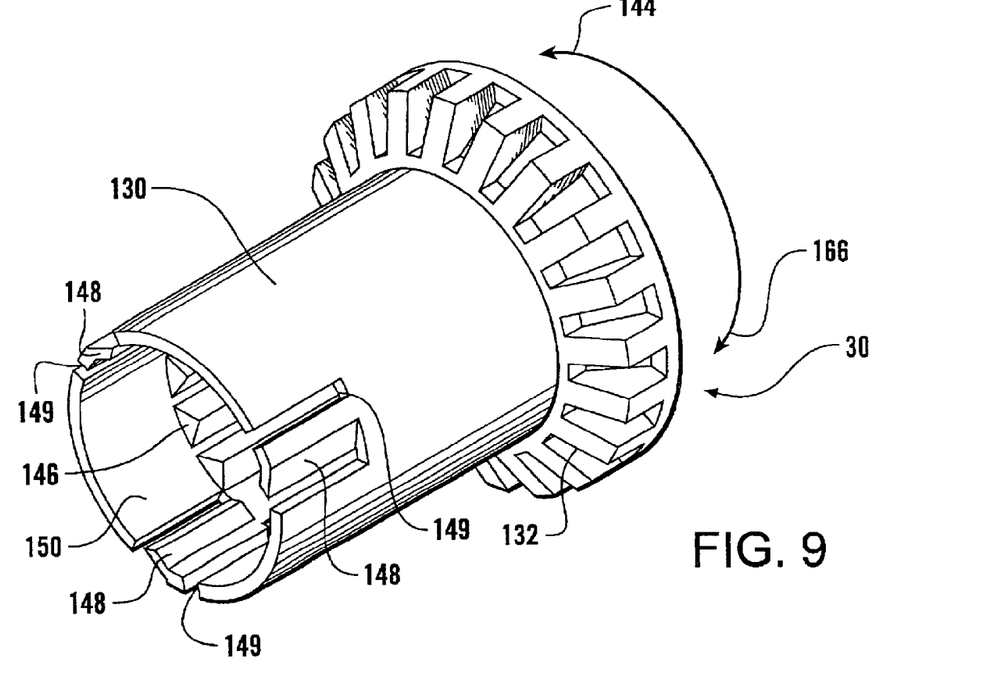
FIG. 9 is a rear perspective view of the gear used in the adjustment mechanism of FIG. 1.

When engaged, gear 30 causes ball stud 24 to rotate and when disengaged, gear 30 acts as a clutching mechanism. Generally, the gear 30 slips in relation to ball stud 24 if over-adjusted in either direction, and engages the teeth 120 of ball stud 24 during adjustment. Gear 30 can be constructed from injection-molded plastic or other material. Referring to FIGS. 1, 2 and 9, gear 30 has several external features. At one end of cylindrical body 130 is a toothed portion having beveled teeth 132 for engagement with bevel gear 64 on the input shaft. The front annular face 134 of the toothed portion is preferably flat and substantially perpendicular to the body 130 axis so that proper gear alignment be maintained between gear 30 and housing 26. On the inside surface 136 of the toothed portion is a number of tangs 138. Tangs 138 act as small flat springs that flex in the radial direction. Tangs 138 protrude inwardly from surface 136, and have a stop face 140 opposite a base 142. The body of tang 138 may be arcuate in shape from base 142 to stop 140. When ball stud teeth 120 are aligned with the tangs 138, the ball stud 24 is prevented from rotation by stop 116. When gear 30 rotates in the counter-clockwise direction as indicated by arrow 166 the tangs 138 slips over teeth 120 to prevent stripping or failure from over adjustment. However, the ball stud teeth 120 engage stop face 140 when an attempt is made to move gear 30 in the opposite direction indicated by arrow 144. More specifically, when gear 30 moves in direction 144, the flexible tangs 138 do provide enough force against the teeth 120 to rotate the ball stud 24. When this happens, ball stud 120 can once again move in a linear direction so that teeth 120 engage splines 146. Thus, tangs 138 prevent permanent disengagement of ball stud 24 and gear 30.

Figure 8:
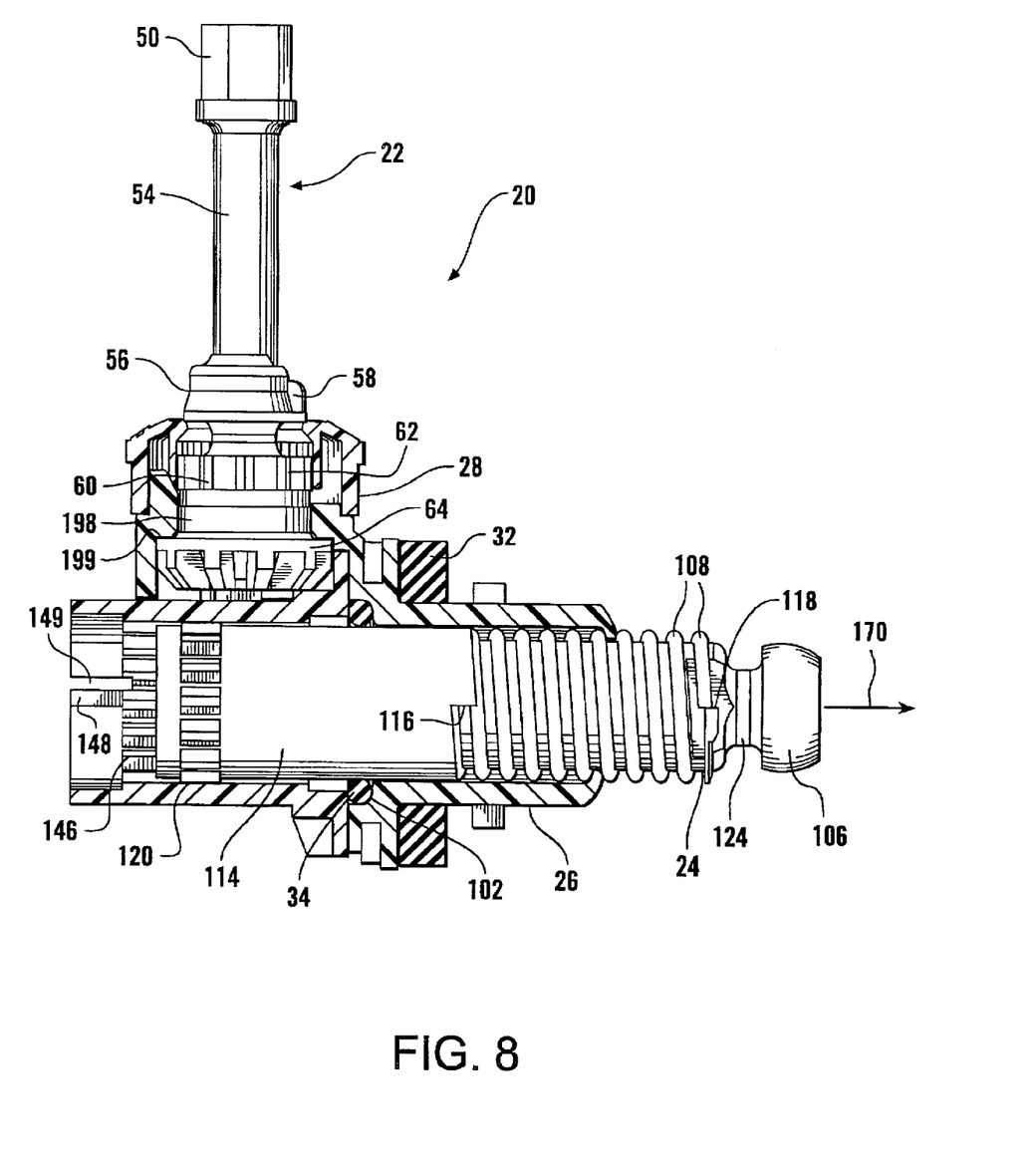
FIG. 8 is a side sectional view of the adjustment mechanism shown in FIG. 1.

Referring to FIGS. 2, 8, and 9, the inner surface of gear 30 has a series of splines 146 so that the body 130 of the gear 30 is essentially an elongated gear ring. Splines 146 engage the teeth 120 of ball stud 24. At the rear end of gear 30, as seen in FIG. 9, are a number of tangs 148 that project inwardly, similar to tangs 138. Slots 149 may be provided in the rear end of gear 30 if additional flexibility of tangs 148 is desired or may be omitted if greater stiffness is desired (the size and depth of slots 149 can be designed to provide the desired clipping and clutching). Once the teeth 120 are adjacent the rear inner surface 150, the gear 30 slips in relation to ball stud 24 when turned in the direction of arrow 144, and the ball stud teeth 120 catches tangs 148 when rotated in the opposite direction of arrow 144. Like tangs 138, tangs 148 are spring-like to allow slipping of the gear. More specifically, when gear 30 rotates in direction 144, the flexible tangs 148 do not provide enough force against the teeth 120 to rotate the ball stud 24. When the gear 30 rotation is reversed, then tangs 148 do engage teeth 120 with enough force to rotate ball stud 120. When this happens, ball stud 120 once again moves in a linear direction so that teeth 120 re-engage splines 146.

Figure 14:
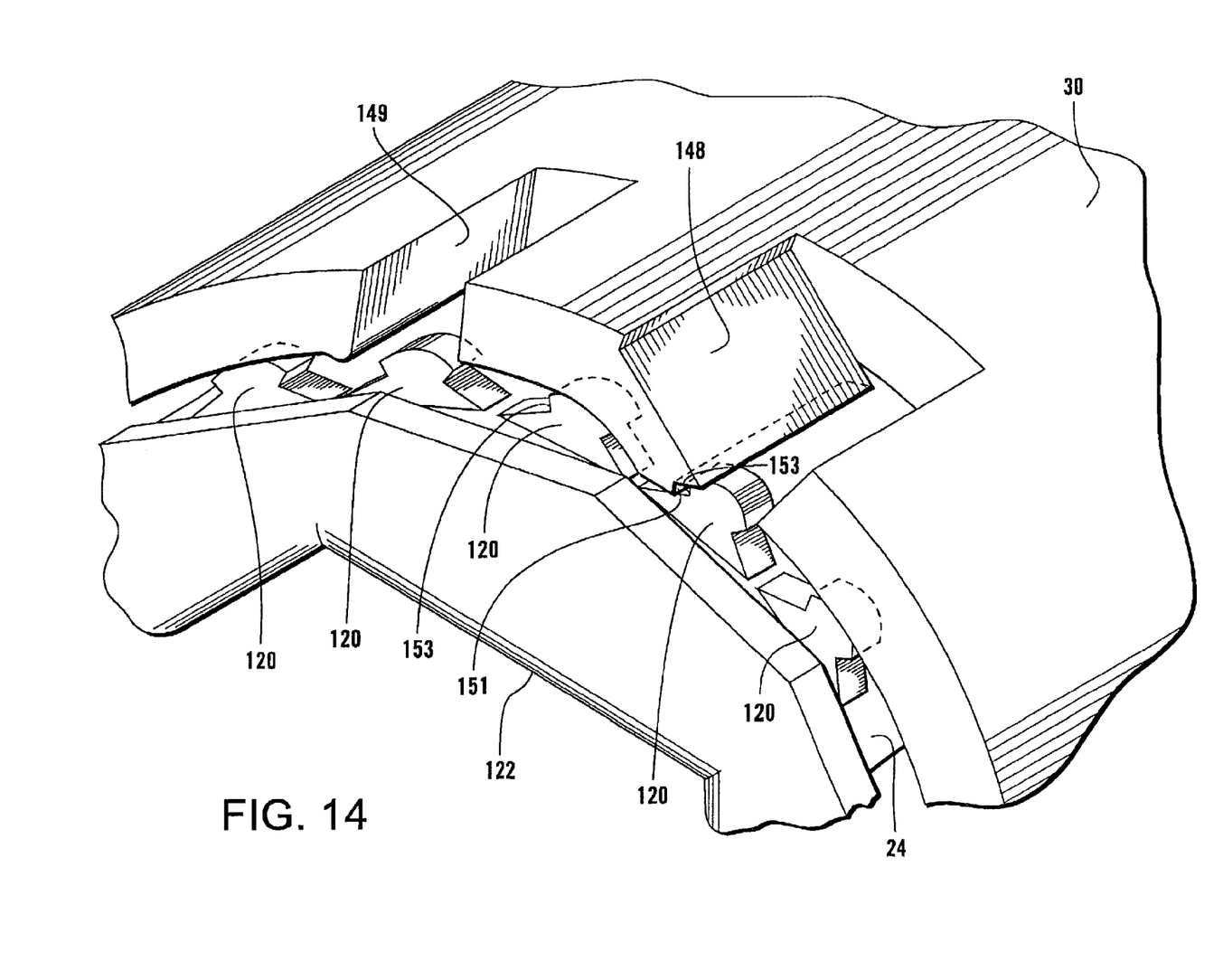
FIG. 14 is a detail of one alternative embodiment of the tangs on the gear and the teeth on the ball stud.

A detail view of an alternative embodiment of the interaction between the tangs 148 on gear 30 and the teeth 120 on the ball stud 24 is shown in FIG. 14. In this embodiment, tangs 148 are provided with a notched portion 151 which engages with a corresponding notched portion 153 on the teeth 120 when the gear 30 is rotated to engage the tangs 148 with the teeth 120. Using notched portion 151 on the tangs 148 and notched portion 153 on the teeth 120 strengthens the engagement between the two parts but does not affect the ability for the parts to slip when the gear is rotated in the opposite direction. Of course, the notched portions could be provided in alternative shapes and dimensions. Additionally, the tangs 138 could also be provided with notched portions in order to strengthen the engagement between tangs 138 and the teeth 120.

The VHAD 28, disclosed in U.S. Pat. No. 6,042,254, incorporated herein by reference, is a plastic component that is disposed about the input shaft 22. VHAD 28 includes a toothed portion that is preferably a thin-walled ring gear portion with internally oriented teeth (not shown). The internally oriented teeth of the ring gear portion have a slightly larger diameter than the outside diameter of the teeth 60 on input shaft 22 so that the teeth are not engaged with each other when the dial is in the disengaged position. When the dial is snapped down, a projection extending from the shoulder 76 of the adjuster distorts the thin-walled ring gear portion so as to cause a partial engagement between the internal teeth of the thin-walled ring gear and the teeth 60 on input shaft 22. This partial engagement is on only one side of the ring gear such that there is clearance between most of the teeth of the ring gear and the teeth on the input shaft. Because of the partial engagement, when the input shaft 22 is rotated, the teeth 60 of the input shaft cause the ring gear to also rotate. However, there are more teeth on the ring gear than teeth 60 on input shaft 22. Thus, the ring gear and dial rotate at a slower rotational speed than the input shaft, and for each degree of rotation of the input shaft, there is a lesser degree of rotation of the ring gear. This differential gives the reading of the amount of post-zeroing adjustment that has been made by referring to the location of a pointer 58 on the input shaft with respect to the zeroed position on the dial. The dial includes indicator lines 154 to indicate how much adjustment has been made since zeroing. Other types of VHAD's could be used and reference to the VHAD disclosed in U.S. Pat. No. 6,042,254 should not be interpreted as limiting the type of adjustment indicating devices that could be used. Alternatively, the adjuster could be adapted to be non-readjustable after factory adjustment using on of the methods disclosed in U.S. Pat. No. 6,050,712 to Burton, the disclosure of which is incorporated herein by reference, or other method.

O-ring 34 and gasket 32 are made from an elastomeric material such as rubber or the like. The purpose of these components is to prevent water or moisture from entering the interior portion 40 of the headlamp assembly 36. Thus, the gasket 32 has an inner diameter sized to correspond with the diameter of barrel 82, and preferably has a cross-section to seat against flange 86. O-ring 34 has an inner diameter sized to seal between housing annular depression 102 and ball stud main body 114, and may have a circular cross-section. The annular depression 102 in connection with the front annular face 134 of the gear 30 form a gland for journaling the O-ring 34. Of course other configurations for journaling the O-ring 34 to ensure proper sealing are possible.

Figure 12:
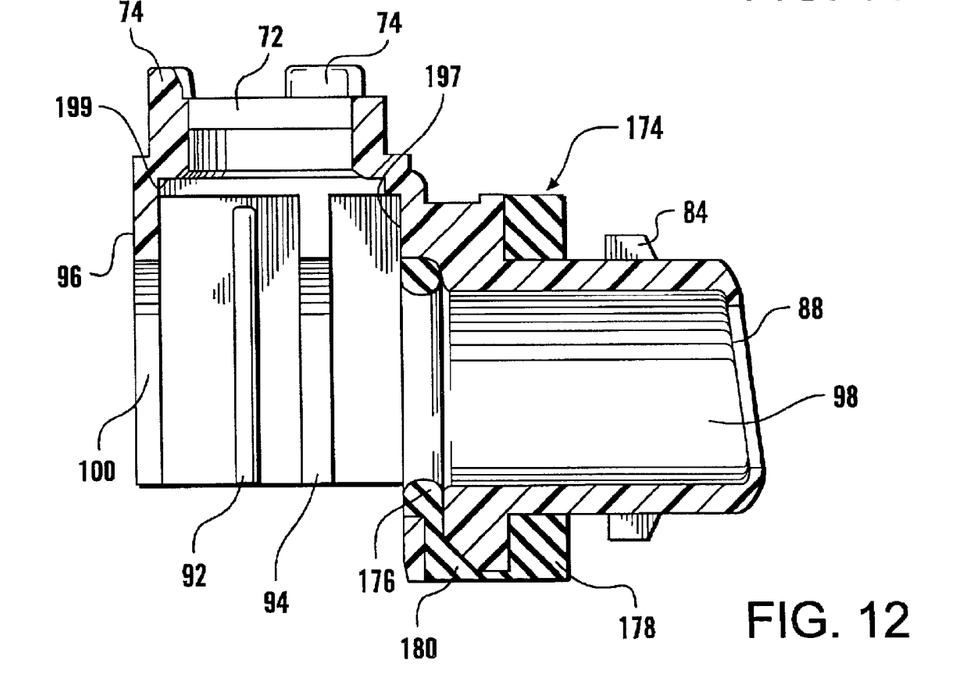
FIG. 12 is a side sectional view of one alternative embodiment of the housing.

Referring to FIG. 12, in an alternative embodiment to the present invention, O-ring 34 and gasket 32 may be replaced by a molded member 174. In this embodiment, the injection molding of housing 26 is a two-part process. First, the housing 26 is formed. The injection mold die is then changed, and molded member 174 is formed using the second die. Molded member 174 serves the same function as the O-ring 34 and the gasket 32 combined. Therefore it has two primary portions, namely a ring portion 176 and a gasket portion 178. A channel 180 links the ring and gasket portions 176, 178. Molded member 174 is constructed from an elastomeric sealing material, which may be injected at any point on the mold where proper flow will occur to fully form ring and gasket portions 176, 178. As shown in the illustrated example, the elastomeric material is injected at or near channel 180. This alternative housing 26 functions in the same manner as that of the previous embodiment, yet does not require a separate assembly step of fitting the O-ring and gasket to housing 26. In this alternative embodiment, the ring and gasket portions 176, 178 are substantially integral to the housing 26.

Referring to FIGS. 2, and 8, the adjuster 20 may be assembled as follows although other methods of assembly could be used. First, gasket 32 is placed against flange 86, and O-ring 34 is seated into housing 26 at annular depression 102. Next, input shaft 22 is inserted into the housing. Gear 30 is placed in the housing 26 so that the face 134 captivates O-ring 34, and beveled teeth 132 are located to the forward side of rib 94 (see FIG. 11) and so that the bevel gear 64 engages the beveled teeth 132 of gear 30. Gear 30 is held in place by the insertion of ball stud 24. The VHAD 28 is then placed onto input shaft 22. Various other views of the assembled adjuster can be seen in FIGS. 4–7.

In certain installations, the VHAD 28 is zeroed after initial aiming and rendered non-recalibratable thereafter. When the initial aiming of the headlamp is being completed, the VHAD 28 is either not attached to the adjuster 20 or is disposed about the adjuster's input shaft in a disengaged storage position (a ramp lock may be provided to maintain the dial in the storage position). After the proper aim has been made, the VHAD 28 is snapped down using a one-way snap so that any further rotation of the input shaft 22 will also result in a pointer 58 extending from the input shaft 22 indicating the adjustment that has been made. As not all uses of adjusters require the use of a VHAD or a non-recalibratable VHAD, and, in certain applications, the VHAD can be entirely eliminated, a recalibratable VHAD may be used, or a device which renders the adjuster non-readjustable may be used.

The assembled adjuster 20 may be operated as follows. By way of example, a clockwise torque as indicated by arrow 162 is applied to input shaft head 50. This application of torque causes the input shaft bevel gear 64 to rotate in the clockwise direction, and the gear teeth 132 to which it is engaged to rotate in the direction of arrow 166 as seen in FIG. 1. Referring now to FIG. 8, this causes the ball stud 24 to move in the direction of arrow 170, assuming that the gear splines 146 are in engagement with ball stud teeth 120. If torque is applied until the stop 116 is in contact with lip stop 90 and the teeth 120 are no longer in engagement with gear splines 146, then ball stud 24 will cease to move in the direction of arrow 170. At this point, teeth 120 slip against gear tangs 138. Movement of ball stud 24 can then only be obtained by reversing the direction of the applied torque.

One the direction of applied torque has been reversed so that the gear 30 moves in the direction opposite to arrow 166 (see FIG. 1), teeth 120 engage tangs 138 causing ball stud to move in the direction opposite of arrow 170 (see FIG. 8.). Ball stud 24 can move in the direction opposite to arrow 170 until teeth 120 are no longer in engagement with gear splines 146 and the lip stop 90 engages thread stop 118. As before, upon continued application of torque, teeth 120 will slip against tangs 148. If the direction of torque is again reversed to that of direction of arrow 162 (see FIG. 1), teeth 120 will engage tangs 148, and the ball stud 24 will once again move in the direction of arrow 170 (see FIG. 8).

The bevel gear 64 and gear 30 are held in alignment with each other so not to deflect away or become misaligned under torque. The outer diameter of the ball stud 24 itself is sufficiently sized to easily withstand radial shear forces exerted upon it by gear 30 that occur under torque. The outer diameter of the ball stud 24 in turn is supported inside and along the length of the housing barrel 82 like a peg in a hole. Gear 30 is restrained axially by annular surface 134 and gear teeth 132 are trapped within the housing surface 197 and rib 94. The inner diameter of header 72 on housing 26 serves to withstand radial forces exerted on the input shaft shoulder 198 from bevel gear 64 that occur under torque. Bevel gear 64 is further supported from axial movement under force since it is trapped between the housing surface 199 and cylindrical body 130 on gear 30.

The ball stud main body 114, gear annular surface 134 and housing depression 102 form a cavity for securing O-ring 34 and preventing it from undesired twisting or relocation during adjustment. Hence a radial seal is created and maintained between the main body 114 diameter and the inner diameter of the housing depression 102 that prevent contaminants from entering the headlamp.

The length of travel that the ball stud is capable of in either direction is dependant upon the length of gear body 114, ball stud 24 and housing barrel 82. The length of these components can be adjusted to fit the requirements of the particular headlamp assembly 36.

As shown in FIG. 13, automotive lamp assemblies 36 used as headlights typically comprise several basic parts: a support frame 42, a headlamp reflector 38, a lens 44, a bulb, and one or more adjusters 20. The support frame 42 houses the headlamp reflector 38 and the bulb on a pivotable mounting to allow the aim of the light to be adjusted using the adjuster 20. The lens 44 seals the front of the assembly 36 to protect it from the elements assailing the front end of the vehicle and provides an aerodynamic shape and attractive appearance. In such an automotive lamp assembly 36, the headlamp reflector 38 mounts inside the housing on one fixed ball joint 46 and is adjustable horizontally and vertically using adjusters 20 that interface with the reflector through moving ball joints (there is only one moving ball joint shown in FIG. 13.). Right angle adjusters are typically used to allow the adjustment of the headlight from an adjusting position above the installed headlight.

Adjuster 20 can also be designed without the clutching feature at one or both ends of the travel of the ball stud 24. Even without the inclusion of the clutching features of the present invention, the adjuster 20 offers improved assembly ability, better sealing, and greater stripping resistance than conventional clutching designs. If the adjuster 20 is designed without clutching at the maximum extension of ball stud 24, then tangs 138 are omitted from the design of gear 30 and the splines 146 extend through the inside surface 136. If the adjuster 20 is designed without clutching at the maximum retraction of ball stud 24, then tangs 148 are omitted from the design of the gear 30 and the splines extend through the rear inner surface 150.

Although the invention has been herein shown and described in what is perceived to be the most practical and preferred embodiments, it is to be understood that the invention is not intended to be limited to the specific embodiments set forth above. Accordingly, it is recognized that modifications may be made by one skilled in the art of the invention without departing from the spirit or intent of the invention and therefore, the invention is to be taken as including all reasonable equivalents to the subject matter of the appended claims. Any reference to claim elements in the singular, for example, using the article "a," "an," "the," or "said," is not to be construed as limiting the element to the singular.

I claim:

1. An adjustment mechanism comprising:
   an adjuster housing having an interior portion;
   an adjustment gear journaled at least partially in the interior portion of the adjuster housing, the adjustment gear having an interior surface with a drive portion and an exterior surface with a toothed portion;
   a ball stud having a threaded portion and a driven portion, at least a portion of the ball stud passing through the interior surface of the adjustment gear such that the driven portion of the ball stud is selectively engageable to the drive portion of the interior surface of the adjustment gear, and wherein the driven portion of the ball stud disengages from the drive portion of the interior surface of the adjustment near to prevent over-adjustment; and
   an input shaft extending from the housing, the input shaft having a bevel gear at an end thereof, the bevel gear at the end of the input shaft in engagement with the toothed portion of the adjustment gear.

2. The adjustment mechanism of claim 1 wherein the drive portion of the interior surface of the adjustment gear is a splined portion and the wherein the driven portion of the ball stud is a splined portion that corresponds to the splined portion of the adjustment gear.

3. The adjustment mechanism of claim 2 wherein the adjustment gear has at least one tang selectively in clutching engagement with the splined portion of the ball stud.

4. The adjustment mechanism of claim 1 further including a VHAD in communication with the input shaft.

5. The adjustment mechanism of claim 1 further including a gasket on an exterior surface of the housing and an O-ring surrounding at least a portion of the exterior surface of the ball stud.

6. The adjustment mechanism of claim 5 wherein the O-ring and gasket are integrally over-molded to the adjuster housing.

7. The adjustment mechanism of claim 1 wherein the threaded portion of the ball stud interfaces with a lip on the housing such that rotation of the ball stud results in axial movement of the ball stud.

8. An adjustment mechanism comprising:
   an adjuster housing;
   an adjustment gear at least partially journaled within the adjuster housing, the adjustment gear including a clutching means;
   an input shaft extending from the housing, the input shaft having a bevel gear at an end thereof, the bevel gear on the end of the input shaft in engagement with the adjustment gear such that rotation of the input shaft causes a corresponding rotation of the adjustment gear;
   a ball stud having a threaded portion and a splined portion, at least a portion of the ball stud passing through the adjustment gear, rotation of the adjustment gear causing axial movement of the ball stud when the clutching means is in an engaged position; and
   wherein the clutching means of the adjustment gear interacts with the splined portion of the ball stud when the ball stud is disposed at a maximum extended position such that rotation of the input shaft in a first direction results in a slipping of the adjustment gear with respect to the splined portion of the ball stud and rotation of the input shaft in a direction opposite the first direction results in engagement of the adjustment gear to the splined portion of the ball stud.

9. The adjustment mechanism of claim 8 wherein the clutching means includes at least one tang for selectively engaging the splined portion of the ball stud.

10. The adjustment mechanism of claim 8 further including a VHAD in communication with the input shaft.

11. The adjustment mechanism of claim 8 wherein the splined portion of the ball stud is selectively engageable to a splined portion on an interior surface of the adjustment gear, and wherein the threaded portion of the ball stud interfaces with a lip on the housing.

12. The adjustment mechanism of claim 8 wherein at least a portion of the ball stud is hollow.

13. The adjustment mechanism of claim 12 wherein at least a portion of the hollow portion of the ball stud is hexagonally shaped.

14. The adjustment mechanism of claim 8 wherein the threaded portion of the ball stud has a first stop at one end of the threaded portion and a second stop at another end of the threaded portion of the ball stud, the first stop interacting with the lip on the housing to prevent over-extension of the ball stud and the second stop interacting with the lip on the housing to prevent over-retraction of the ball stud.

15. A headlamp assembly comprising:
   a support frame having an open front portion and at least one fixed ball stud;
   a lens disposed over the open front portion of the support frame;
   a reflector having a plurality of ball sockets positioned within the support frame and pivotably attached to the at least one fixed ball stud;
   an adjuster housing secured to the support frame, the adjuster housing having a gear journaled at least partially within the adjuster housing, the gear having an internal splined portion, an exterior toothed portion, and a clutching means;
   an input shaft having a bevel-toothed end, the bevel-toothed end of the input shaft engaging the exterior toothed portion of the gear; and
   a moveable ball stud having a threaded portion and a splined portion, the threaded portion engaging a lip on the adjuster housing, the splined portion selectively engageable to the internal splined portion and the clutching means of the gear, the moveable ball stud having a ball end extending from the adjuster housing into the support frame and engaged in one of the plurality of ball sockets in the reflector.

16. The headlamp assembly of claim 15 wherein the clutching means of the gear comprises at least one tang selectively engageable with the splined portion of the ball stud.

17. The headlamp assembly of claim 16 further including a VHAD in communication with the input shaft.

18. The headlamp assembly of claim 15 wherein the ball stud is at least partially hollow.

19. The adjustment mechanism of claim 15 wherein the threaded portion of the ball stud has a stop at each end thereof.

20. An adjustment mechanism comprising:
   an adjuster housing having an interior portion;
   an adjustment gear journaled at least partially in the interior portion of the adjuster housing, the adjustment gear having an interior surface with a drive portion and an exterior surface with a toothed portion;
   a ball stud having a threaded portion and a driven portion; at least a portion of the ball stud passing through the interior surface of the adjustment gear such that the driven portion of the ball stud is selectively engageable to the drive portion of the interior surface of the adjustment gear, and wherein the driven portion of the ball stud disengages from the drive portion of the interior surface of the adjustment near to prevent over-adjustment;

an input shaft extending from the housing, the input shaft having a bevel gear at an end thereof, the bevel gear in engagement with the toothed portion of the adjustment gear; and wherein rotation of the input shaft causes rotation of the bevel gear, rotation of the adjustment gear, coaction between the drive portion of the adjustment gear and the driven portion of the ball stud when the ball stud is engaged to the drive portion of the adjustment gear which causes a corresponding rotation of the ball stud, and axial movement of the ball stud.

21. An adjustment mechanism for use in connection with a headlamp assembly having a support frame, the adjustment mechanism comprising:

an adjuster housing;

an adjustment gear at least partially journaled within the adjuster housing;

an input shaft extending from the housing, the input shaft cooperating with the adjustment gear such that rotation of the input shaft causes a corresponding rotation of the adjustment gear;

a ball stud extending from the adjuster housing with at least a portion of the ball stud passing through the adjustment gear and selectively engageable thereto, wherein rotation of the adjustment gear causes movement of the ball stud when the ball stud is engaged to the adjustment gear, and wherein the ball stud is selectively driveable by the adjustment gear such that the ball stud disengages from the adjustment gear to prevent over-adjustment; and an integrally formed sealing member including a gasket portion on an exterior surface of the adjuster housing and an O-ring portion surrounding at least a portion of the ball stud.

22. An adjustment mechanism for use in connection with a headlamp assembly, the adjustment mechanism comprising:

an adjuster housing;

an adjustment gear at least partially journaled within the adjuster housing;

an input shaft extending from the housing, the input shaft cooperating with the adjustment gear such that rotation of the input shaft causes a corresponding rotation of the adjustment gear;

a ball stud extending from the adjuster housing with at least a portion thereof passing through the adjustment gear and selectively engageable thereto, rotation of the adjustment gear causing axial movement of the ball stud when the ball stud is engaged to the adjustment gear, and wherein the ball stud is selectively driveable by the adjustment near such that the ball stud disengages from the adjustment sear to prevent over-adjustment; and an O-ring journaled within a gland inside the adjuster housing and disposed about at least a portion of the ball stud, the gland formed by the a face of the adjustment gear and an annular depression in the adjuster housing.

* * * * *